United States Patent Office 3,078,210
Patented Feb. 19, 1963

3,078,210
NITRILE-ESTER PESTICIDE
Lee A. Miller, Dayton, Ohio, assignor to Monsanto Chemical Company, St. Louis, Mo., a corporation of Delaware
No Drawing. Filed Jan. 3, 1961, Ser. No. 80,027
13 Claims. (Cl. 167—22)

The present invention relates to nitrile-esters and more particularly provides new and valuable cyanoalkyl esters of propiolic acid, the method of preparing the same, biological toxicant compositions comprising the new propiolates, and methods of inhibiting the growth of microorganisms in which said compositions are used.

According to the invention, the cyanoalkyl propiolates are prepared by the reaction of a cyanoalkanol with propiolic acid or an acyl halide or an anhydride thereof, the reaction with, e.g., propiolyl chloride proceeding as follows:

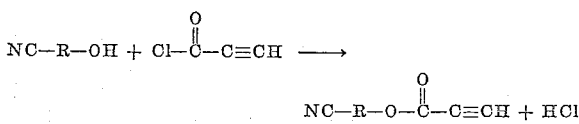

in which R is a bivalent alkylene radical of from 2 to 6 carbon atoms.

Examples of cyanoalkyl propiolates provided by the invention and the cyanoalkanols from which they are prepared are:

2-cyanoethyl propiolate from hydracrylonitrile;
2-cyano-1-methylethyl propiolate from 3-hydroxybutyronitrile;
3-cyanopropyl propiolate from 4-hydroxybutyronitrile;
2-cyano-2-methylpropyl propiolate from 2,2-dimethylhydracrylonitrile;
4-cyanobutyl propiolate from 5-hydroxyvaleronitrile;
2-cyano-1-ethylethyl propiolate from 3-hydroxyvaleronitrile;
5-cyanopentyl propiolate from 6-hydroxyhexanenitrile;
4-cyano-1-methylbutyl propiolate from 5-hydroxyhexanenitrile; and
6-cyanohexyl propiolate from 7-hydroxyheptanenitrile.

Reaction of the cycloalkanol with the propiolic acid or acyl halide or anhydride thereof takes place readily by simply contacting the acidic compound with the cyanoalkanol at ordinary or increased temperature and in the presence of an inert diluent or solvent. Advantageously, when propiolic acid is used, reaction is effected at a temperature of from, say 50° C. to 120° C. and heating within this temperature range is conducted until the desired extent of esterification has occurred. Using the propiolyl halide, i.e., propiolyl chloride, bromide, iodide or fluoride, optimum conditions include operation at temperatures which may be as low as, say, —10° C., i.e., extraneous heating will be generally unnecessary; instead, cooling may be employed. Since formation of the ester occurs by reaction of one mole of the cyanoalkanol with one mole of the propiolic acid compound, the two reactants are advantageously employed in such stoichiometric proportion. However, an excess of the acidic compound may be employed, since any unreacted acid, anhydride or halide may be readily removed from the reaction product.

The presence of an inert diluent or solvent and operation at a temperature which is below 120° C. is advantageous in avoiding side-reactions, e.g., polymerization; operation in this manner apparently permits substantial limitation of the reaction to esterification, rather than to other reactions which could be expected to occur with the highly active, triple-bonded acidic compounds and the difunctional cyanoalkanol.

Inert liquid diluents which are useful for the present purpose are liquid hydrocarbons generally, halogenated hydrocarbons, ethers, or ketones, e.g., benzene, toluene, xylene, hexane, petroleum spirits, dichlorobenzene, ethylene dichloride, carbon tetrachloride, tetrachlorohexane, dioxane, isopropyl ether, acetone, butanone, etc. The solvent or diluent, of course, serves to facilitate uniform distribution of the reactants throughout the reaction medium. When reacting a propiolyl halide with the cyanoalkanol, it is preferred to employ a solvent or diluent which minimizes the tendency of the hydrogen halide by-product to react with the triple bond of the propiolic acid compound. In this connection the solvent or diluent is selected on the basis of being the least compatible or having the poorest solvency for hydrogen halide. The preferred solvents or diluents for this purpose may be the cycloalkanes, e.g., cyclohexane, cyclopentane or the alkyl substituted cycloalkanes, etc., and the halogenated hydrocarbons.

When using propiolic acid as the starting material in the esterification reaction, water is formed as a by-product material. Since the reaction is of the equilibrium type, it is preferred that the by-product water be removed continuously during the course of the reaction in order to have the equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the solvent or diluent. Considering the prerequisites of a solvent or diluent, generally any organic material which is non-reactive with either the reactants or the product materials may be employed. The quantity of solvent or diluent employed in the reaction varies considerably depending upon the result which is desired. In some instances it may be desirable to employ a relatively small quantity of diluent as compared to the amount of reactants which are being used, whereas in other cases it may be desirable to use a relatively large quantity of solvent or diluent to facilitate intermixing of the reactants.

We have also found that when effecting the reaction with the free acid or the acid anhydride as the acid component, it is advantageous to operate in the presence of an acidic material as catalyst. Acids which are useful for this purpose are, e.g., the mineral acids such as sulfuric, hydrochloric, nitric or phosphoric acid, or chlorosulfonic acid, acidic salts such as ferric chloride or magnesium bisulfate, organic sulfonic acids such as benzenesulfonic acid, 4-toluenesulfonic acid, etc.

The presently provided propiolates are stable, well-characterized compounds which are advantageously employed for a variety of industrial and agricultural purposes, e.g., as copolymerizing monomers with vinyl compounds in synthetic resin and plastics manufacture; and, as will be hereinafter shown, as toxicant compositions effective in preventing or inhibiting the growth of fungi and bacteria.

The invention is further illustrated by, but not limited to, the following examples:

Example 1

A mixture consisting of 14.2 g. (0.2 mole) of hydracrylonitrile, 15.4 g. (0.22 mole, 10% excess) of propiolic acid, 0.5 g. of 4-toluenesulfonic acid and 150 ml. of benzene was stirred at reflux under a Dean-Stark apparatus for 4.5 hours. During this time 3.4 ml. (95% of theory) of water had collected. The reaction mixture was allowed to cool and then washed with 10% aqueous sodium bicarbonate and water. It was evaporated to remove solvent and subsequently distilled to give the substantially pure 2-cyanoethyl propiolate, B.P. 127° C./25 mm., $n_D^{25}$ 1.4500, which analyzed 58.32% carbon and 4.34% hydrogen as against 58.53% and 4.09%, the calculated values. Infrared analysis showed the following structures:

≡CH at 3300 cm.$^{-1}$
$CH_2$ at 3000 cm.$^{-1}$
C≡N at 2260 cm.$^{-1}$
C≡CH at 2120 cm.$^{-1}$
C=O at 1725 cm.$^{-1}$
C—O-ester at 1240 cm.$^{-1}$

*Example 2*

This example shows testing of the 2-cyanoethyl propiolate of Example 1 against the bacteria *Staphylococcus aureus* and *Salmonella typhosa*. The following procedure was used:

A 1% acetone solution of the test compound was prepared and added to sterile, melted nutrient agar to give a 0.001% concentration of the test compound. The agar solution of the test compound was then poured into Petri dishes and allowed to harden. These plates as well as duplicate "controls" (plates of sterile nutrient agar containing the same concentration of acetone but none of the test compound) were respectively inoculated with the *Staphylococcus aureus* or the *Salmonella typhosa* and incubated for two days at 37° C. At the end of that time, inspection of the plates showed no growth of either of the test bacteria on those of the plates which contained the 0.001% concentration of the 2-cyanoethyl propiolate, whereas profuse growth of both of the test organisms was noted on the "controls."

*Example 3*

This example shows testing of the 2-cyanoethyl propiolate of Example 1 against the fungus *Aspergillus niger*. The following procedure was used:

An inoculum preparation of *Aspergillus niger* SN–111 was prepared by adding 10 ml. of sterile distilled water to a 7-day old, Sabouraud's dextrose agar slant culture thereof and dislodging the spores into the water with a transfer needle.

Culture media was prepared by respectively adding 18 ml. of Sabouraud's dextrose agar to 18 x 150 mm. straight side test tubes, capping with metal culture tube caps, and sterilizing in an autoclave for fifteen minutes at 121° C.

A stock solution of the test compound was prepared by dissolving 100 mg. of the compound in 10 ml. of acetone; a 1% acetone solution of the compound was thus obtained.

Using a sterile 5 ml. pipette, 2 ml. of said 1% solution were respectively transferred to a tube of melted, sterile culture media prepared as described above. Dilutions of 1 part of test compound per 1,000 parts of agar resulted. Dilution was thus repeated until a concentration of one part of test compound per 10,000 parts of agar was obtained. The thus-diluted agar was then poured into a sterile Petri dish and allowed to harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in that plate which contained the 1:10,000 concentration of the 2-cyanoethyl propiolate, whereas profuse growth of the *Aspergillus niger* was noted in both of the "control" plates.

*Example 4*

The 2-cyanoethyl propiolate of Example 1 was tested against the soil fungus *Rhyizoctonia solani*. Testing was conducted by adding to soil which had been uniformly infected with the fungus a quantity of the propiolate which was 0.003% of the weight of the soil, thoroughly mixing the whole, incubating at 25° C. for 24 hours, seeding pots of the incubated soil with cotton and cucumber seeds, maintaining the seeded pots for 48 hours at 70° F. and at a high relative humidity (96–98%), removing the pots to the greenhouse, maintaining them there for 2 weeks, and inspecting them for number of seedlings emerged and the condition of the shoots and roots thereof. A similar testing procedure was conducted with "controls," i.e., similarly inoculated soil which had not been chemically treated. A very poor percent emergence and a stunted diseased condition of those of the plants which had emerged was noted in the controls, whereas excellent germination and plant growth was observed in the pots of inoculated soil which contained the 0.003% concentration of 2-cyanoethyl propiolate.

Similar testing of the 2-cyanoethyl propiolate against the soil fungus *Pythium ultimum* showed complete inhibition of the Pythium at the 0.003% concentration.

The present cyanoalkyl propiolates are characterized by a high degree of efficacy in that they possess biological toxicant efficacy at very low concentrations. Fungistat or bacteriostat compositions containing the present compounds are advantageously formulated by first preparing a solution thereof in an organic solvent and then adding the resulting solution to water containing an emulsifying agent to form an oil-in-water emulsion. Emulsifying agents which may be employed are those customarily used in the art for the preparation of oil-in-water emulsions, e.g., the higher alkylbenzenesulfonates, the long chained polyalkylene glycols, the long chained alkylsulfosuccinates, etc.

While the present compounds are most advantageously employed as biological toxicants by incorporating them into an emulsion as herein described, they may also be incorporated into solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution.

What I claim is:

1. The method which comprises contacting a hydroxy nitrile of the formula NC—R—OH in which R is an alkylene radical of from 2 to 6 carbon atoms, with an acidic compound selected from the class consisting of propiolic acid and the anhydride and acyl halides thereof, and recovering from the resulting reaction product an ester of the formula $$NC-R-O-\overset{O}{\underset{\|}{C}}-C\equiv CH$$

wherein R is as defined above.

2. The method which comprises heating 2-cyanoethanol with propiolic acid in the presence of an acidic catalyst and recovering 2-cyanoethyl propiolate from the resulting reaction product.

3. A composition effective against fungi and bacteria which comprises an inert carrier and, as the essential effective ingredient, an ester of the formula $$NC-R-O-\overset{O}{\underset{\|}{C}}-C\equiv CH$$

wherein R is an alkylene radical of from 2 to 6 carbon atoms.

4. A composition effective against fungi which comprises an inert carrier and as the essential effective ingredient, an ester of the formula $$NC-R-O-\overset{O}{\underset{\|}{C}}-C\equiv CH$$

wherein R is an alkylene radical of from 2 to 6 carbon atoms.

5. A composition effective against bacteria which comprises an inert carrier and as the essential effective ingredient, an ester of the formula $$NC-R-O-\overset{O}{\underset{\|}{C}}-C\equiv CH$$

wherein R is an alkylene radical of from 2 to 6 carbon atoms.

6. A composition effective against fungi and bacteria which comprises an inert carrier and 2-cyanoethyl propiolate as the essential effective ingredient.

7. A composition effective against bacteria which comprises an inert carrier and 2-cyanoethyl propiolate as the essential effective ingredient.

8. A composition effective against fungi which comprises an inert carrier and 2-cyanoethyl propiolate as the essential effective ingredient.

9. The method of inhibiting the growth of microorganisms selected from the class consisting of fungi and bacteria which comprises exposing the microorganisms to a growth-inhibiting quantity of a compound of the formula

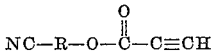

wherein R is an alkylene radical of from 2 to 6 carbon atoms.

10. The method of inhibiting the growth of fungi which comprises exposing the fungi to a growth-inhibiting quantity of a compound of the formula

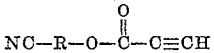

wherein R is an alkylene radical of from 2 to 6 carbon atoms.

11. The method of inhibiting the growth of fungi which comprises exposing the fungi to a growth-inhibiting quantity of 2-cyanoethyl propiolate.

12. The method of inhibiting the growth of bacteria which comprises exposing the bacteria to a growth-inhibiting quantity of a compound of the formula

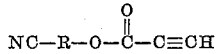

wherein R is an alkylene radical of from 2 to 6 carbon atoms.

13. The method of inhibiting the growth of bacteria which comprises exposing the bacteria to a growth-inhibiting quantity of 2-cyanoethyl propiolate.

References Cited in the file of this patent

UNITED STATES PATENTS 2,552,814   Ralston _____ May 15, 1951

FOREIGN PATENTS 168,042   Switzerland _____ June 1, 1934